2,995,490
POULTRY BLACKHEAD CONTROL COMPOSITION AND METHOD OF USING SAME

Ammon M. Brubaker, Sheridan, and James R. Wiley, Myerstown, Pa., assignors to Whitmoyer Laboratories, Inc., Myerstown, Pa., a corporation of Delaware
No Drawing. Filed Sept. 23, 1957, Ser. No. 685,433
10 Claims. (Cl. 167—53.1)

This invention relates generally to the art of veterinary medicine and more particularly to the chemotherapy of the disease in poultry known as enterohepatitis, commonly called "blackhead."

Blackhead disease or enterohepatitis is caused by the one celled protozoan parasite called *Histomonas meleagridis*, which is too small to be seen with the naked eye. The disease has been a serious problem for turkey raisers for many years. Losses due to the disease may be very extenisve and in some instances have run as high as 100%, with turkeys of all ages susceptible. Young birds may suffer a very acute attack and die without showing signs of sickness while they are still in good flesh. Adult birds that are sick for several days before death usually become very thin.

The parasite first attacks the cecal tubes, causing ulceration and thickening of the cecal tube walls. A hard yellow core which is blood-stained usually develops. At the same time these changes are taking place in the cecal tubes, the blackhead organisms migrate to the liver where they set up sites of infection. These produce lesions on the surface of the liver which are grayish-white or yellowish in color. As a rule, the border of the lesion is raised and the center depressed. In the more advanced cases, these liver lesions grow together to produce large areas of degenerated tissue. At times, the cecal tubes will ulcerate, and infection spreads to the peritoneal lining producing adhesions and inflammation in the abdominal cavity. Mortality in a turkey flock usually develops in 12 to 21 days after infection.

The parasite causing blackhead is passed in the droppings of infected birds. These parasites are readily destroyed by sunshine and air, but they persist in the litter and on the ground for a long time when protected inside cecal worm eggs. Because of this it is believed that most birds pick up the infection by consuming infected cecal worm eggs. Even with the best management practices, blackhead is still a threat to all flocks of turkeys because they are susceptible to the disease during the entire growing period. Blackhead differs from coccidiosis and other protozoan diseases of turkeys in that infection apparently stimulates little or no immunity or resistance. Thus the flock is subject to relapse after an outbreak is brought under control. Consequently, it is desirable to provide a means of combatting this disease in turkeys which not only can be made effective to rid a flock after the disease has set in and become advanced, but which also may by modification, if necessary, be used as a preventive so that the disease will be checked or prevented before it gets a good start.

Although blackhead has been particularly devastating in turkey flocks, the disease also attacks chickens and other poultry, but turkeys appear to be the most susceptible.

In accordance with our invention, a composition having an active chemotherapeutic effect and a method of treatment are provided for preventing the disease of blackhead in poultry.

We have found that a certain organic compound, namely, p-ureido benzene arsonic acid, and salts thereof, may be used effectively in preventing the disease of blackhead in poultry and that effective dosage may be provided by administering the compound in a poultry ration within definite ranges of concentration which are non-toxic.

This compound, namely, p-ureido benzene arsonic acid and salts thereof have been found to be effective when administered by admixture, suspension or dispersion in the normal comestibles or rations ingested by poultry. And it will be understood that these comestibles or rations include the feed and drink normally partaken or consumed by the birds, such as grain, mash, scratch, and the like and water or other comestible liquids.

The general range of concentration of the p-ureido arsonic acid if administered by ad libitum feeding in the ration is from 0.01% to 1.0%. If the ration is a comminuted solid, such as mash, and the acid form of the compound is used, the optimum concentration for effective therapy is in the range of from 0.05 to 0.1% of the weight of the feed and if used in the drinking water effective dosage is provided at 0.02% to 0.04% which is about half the percentage concentration of the compound when used in solid feed, such as mash.

In general, the effective dosage when the compound is administered in an ad libitum feed ration or in the drinking water will depend somewhat on the severity of the infection and the size and age of the birds or whether the compound is being administered only as a preventive or as a treatment for an established infection in the flock. And if administered in the requisite concentrations to provide effective dosage, the birds under treatment show little or no toxic effects and turkeys in particular which were given only preventive dosage concentrat..n of the compound showed as good, or even better growth rate and general thriftiness than control birds to which were fed the same, but unmedicated, ration.

In the case of combatting an established case of blackhead in chickens, for example, the preferred concentration of the compound for effective results, if a chicken mash ration is used for administering the compound, is a drug level or concentration of 0.1% for the first five days of treatment and 0.05% for the next five days. The reason for this change in concentration during treatment is that the drug is administered by ad libitum feeding of the medicated ration and sick birds may not be eating normally so the concentration is doubled to provide double the drug concentration the first five days to compensate for lower feed intake.

However, it will be understood that the concentration can be varied from the above and still obtain effective results in using the compound as a preventive in controlling blackhead in chickens, or turkeys, or other poultry and such concentrations may be from .01% to 1.0% of p-ureido benzene arsonic acid in the feed ration composition, it having been found that most poultry can partake of a 1.0% concentration in a mash feed without undue toxic effects. If the drug is administered in drinking water, the range of concentration for effective results is within the range of 0.005% to 0.05% based on the weight of the drinking water.

In the event that it is desired to use the medicated composition as a preventive for controlling blackhead in turkeys, as distinguished from treatment to stamp out a well established infection in the flock, the concentration of the p-ureido benzene arsonic acid in the turkey feed mash which has been found to be desirable and effective is 0.0375%. At this drug level, namely, 0.0375% the turkeys may be fed their usual ration but containing the active chemotherapeutic agent, during the entire growing period; and as a result the flock will not be set back because of blackhead disease for the reason that the medicated feed prevents the birds from contracting the disease. Hence, the disease will not get a start and therefore a serious and advanced epidemic of blackhead does not develop in the flock.

Although the novel features which are believed to be characteristic of the invention are pointed out in the annexed claims, the invention itself and the manner in which it may be carried out may be better understood by referring to the following specific examples in which are set forth various tests.

EXAMPLE A

Twenty Beltsville white turkey poults were divided into 5 groups of 4 each at six weeks of age. The groups were designated I to V. Each group was fed the same commercial growing mash except that Group I contained no medication and served as a control. Groups II to V were fed the same ration as Group I except that the mash contained predetermined percentages of p-ureido benzene arsonic acid as set forth in the following Table I. The medicated rations were started 48 hours before administering embryonated cecal worm eggs to all of said five groups to induce blackhead. The five groups were fed ad libitum. Three hundred cecal worm eggs were given to each turkey on the third, fourth and fifth day. Weight and feed consumption were recorded at the fifth, twelfth, and seventeenth days. The test was terminated at seventeen days because the batteries had to be vacated and fumigated for use in other scheduled tests. At the end of the seventeen days the controls were sick and showed typical yellow droppings characteristic of blackhead but the birds fed medicated feed thrived.

Table I
RATION—COMMERCIAL TURKEY FEEDING MASH

| Group | Percent drug in mash |
| --- | --- |
| I | None (control). |
| II | 0.025 p-ureido benzene arsonic acid. |
| III | 0.05 p-ureido benzene arsonic acid. |
| IV | 0.1 p-ureido benzene arsonic acid. |
| V | 0.2 p-ureido benzene arsonic acid. |

The results of this test showed that the turkey poults which received medicated feed containing p-ureido benzene arsonic acid at levels of .025% to .2% did not show symptoms of blackhead disease. It will be understood by those familiar with this art that the term "level" is commonly used to designate the concentration by weight of the drug in the feeding medium. In post mortem examination after the seventeenth day, the four poults in the control group (Group I) showed severe infection in the cecal tubes and two of these showed liver lesions typical of blackhead disease. The groups which received the medicated feed did not have lesions in the cecal tubes or on their livers, except one in Group II, which showed mild lesions in the cecal tubes. Weight gains were normal. The test shows that p-ureido benzene arsonic acid is active in suppressing blackhead disease.

EXAMPLE B

This example describes a test which was conducted to determine the effects of continuous feeding of p-ureido benzene arsonic acid on turkey poults and also to determine how much arsenic accumulates in the tissues during a prolonged feed period.

One hundred and twenty-seven straight run, day old broad breasted white turkey poults were divided at random into four groups: thirty-one in Group 1B; and thirty-two in each of Groups 2B, 3B and 4B. These groups were fed the levels of p-ureido benzene arsonic acid shown in the following Table II continuously for 12 weeks on an all-mash basis. The basal ration for all groups was a well-known brand of turkey starter feed for the first six week period and a well-known brand of turkey grower feed for the second six week period. The basal ration did not contain any other arsenical or coccidiostat.

Table II

| Group | Percent p-ureido benzene arsonic acid in the feed ration |
| --- | --- |
| 1B | None |
| 2B | .0125 |
| 3B | .025 |
| 4B | .05 |

The rearing conditions of each group were the same: confinement on a brooder house floor using infra-red lamps as heat source.

The poults, or the experimental birds, were of poor quality on arrival and the mortality for the first 20 days was excessive. It was determined by diagnostic examination that the poults suffered from a non-specific enteritis and they were treated with sulfa drugs followed by Terramycin. From the sixth to the twentieth day the poults were given this treatment intermittently. At the end of this period the most severely infected birds had died and those remaining appeared to have responded to the treatment and this medication was terminated.

The mortality record of the test is reported in Table III in two phases: The mortality for the first twenty days and the mortality after twenty days through twelve weeks, the termination date.

Table III
MORTALITY TABLE (2 PHASES—FIRST 20 DAYS AND 20 DAYS TO 13 WEEKS)

| Lot or group | 1st phase | | | 2d phase | | Total | |
| --- | --- | --- | --- | --- | --- | --- | --- |
| | Treatment | No. start | M 1st 20 days | Percent M | M 20 days to 13 weeks | Percent M [1] | M entire ex. | Percent M [2] |
| 1B | Control, basic | 31 | 3 | 9.6 | 1 | 3.5 | 4 | 12.9 |
| 2B | 0.0125% P-ureido benzene arsonic acid | 32 | 6 | 18.7 | 2 | 7.6 | 8 | 25 |
| 3B | 0.025% P-ureido benzene arsonic acid | 32 | 4 | 12.5 | 0 | 0 | 4 | 12.5 |
| 4B | 0.05% P-ureido benzene arsonic acid | 32 | 0 | 0 | 1 | 3.2 | 1 | 3.2 |
| | Totals | 127 | 13 | 10 | 4 | 3.6 | 17 | 13 |

M=mortality.
[1] Calculated on birds remaining after 20 days.
[2] Calculated on number of birds started.

After eliminating the mortality which took place the first 20 days due to a congenital infection, it can be observed from Table III that the mortality was not excessive and not related to the treatment with p-ureido benzene arsonic acid. Group 4B which received the largest amount of the drug had the least mortality. The combined average mortality of Groups 2B, 3B and 4B was 3.5% as against 3.4% in the control Group 1B. Hence, it will be seen that the drug, p-ureido benzene arsonic acid, may be administered within the tolerances indicated over extended periods of time without causing appreciable loss by mortality in a flock. No gross serious ill effects were noted on the continuous feeding of p-ureido benzene arsonic acid at levels up to .05% on an all mash basis. Consequently, it may be concluded that the drug may be safely administered for combatting the disease of blackhead.

An examination was also made to determine residual arsenic in the liver and muscle tissues. The arsenic assay showed 1.6 p.p.m. (parts per million) in the liver and .11 p.p.m. in muscle tissue in the birds from Group 3B, six days after the medicated diet feed was terminated.

EXAMPLE C

In another test to determine the effectiveness of the drug, p-ureido benzene arsonic acid, for prevention of blackhead in turkey poults, 130 straight run broad breasted white turkey poults were divided in four groups as follows: Group 1C, 32 poults; Group 2C, 32 poults; Group 3C, 33 poults; and Group 4C, 33 poults. The rearing conditions were the same for all groups, namely, confinement to a brooder house floor, peat moss litter, and infra-red lamps as a heat source.

The basal ration consisted of a commercial turkey starter mash and after six weeks a commercial growing mash. These did not contain any arsenicals, coccidiostats, or drugs for prevention of blackhead, other than the p-ureido benzene arsonic acid added to the feed by us as indicated in the following Table C.

The following drug levels were maintained in the feed mash which was fed ad libitum and continuously for fourteen weeks on an all mash basis. Plain drinking water was, of course, available to the birds at all times.

*Table C*

| Group or pen | Drug levels, percent drug in feed mash |
|---|---|
| 1C | None (control). |
| 2C | 0.0375% p-ureido benzene arsonic acid. |
| 3C | 0.05% p-ureido benzene arsonic acid. |
| 4C | 0.025% X.[1] |

[1] A blackhead remedy purchased in the market.

In order to introduce blackhead infection, each poult was given 100 embryonated cecal worm eggs at 4 weeks of age. At six weeks, embryonated cecal worm eggs were mixed in wet mash and an equal quantity sprinkled on top of the feeders in each pen. A post mortem examination was made on each individual that died during the feeding period. After 14 weeks most of the surviving birds were put on an unmedicated ration for 10 days and then slaughtered.

Twelve turkeys from each of Group 2C and Group 3C (6 toms and 6 hens from each group) were continued on their respective medicated rations until these birds were fed the medicated feed for a period of 25 weeks. A tom and a hen from each group were killed and liver and muscle tissue taken for an arsenic assay on the last day of medication. This was repeated at 5, 7, and 14 days after the medicated rations were discontinued by slaughtering one tom and one hen.

A summary of the data and results of these tests are set forth in the following Tables IC to VC.

SUMMARY OF DATA

Turkey blackhead test 2/23/56–5/16/56
3/26/56—turkeys inoculated—100 embryonated cecal eggs (no observable effects)
4/9/56—turkeys inoculated—embryonated cecal eggs in wet mash (effective)

*Table IC.—2/23/56–3/21/56*

4 WEEKS OF AGE (BEFORE ANY INFECTION)

| Group | No. of turkeys start | Died | No. rem. | Total feed cons. | Avg. con. per turkey | Avg. wt. per turkey, lbs. | Rank |
|---|---|---|---|---|---|---|---|
| 1C | 32 | 1 | 31 | 63 | 2.03 | .758 | 4 |
| 2C | 32 | 2 | 30 | 64 | 3.13 | .867 | 2 |
| 3C | 33 | 1 | 32 | 56 | 1.75 | .922 | 1 |
| 4C | 33 | 0 | 33 | 70.5 | 2.13 | .788 | 3 |
|  | 130 | 4 | 126 |  |  |  |  |

*Table IIC*

3/21/56–4/4/56—6 WEEKS OF AGE (COVERING PERIOD OF TWO INOCULATIONS 3/26–4/2)

| Group | No. of turkeys, 3/4 | Died, 3/21–4/4 | No. rem., 4/4 | Total feed cons. to 4/4 | Avg. con. per turkey, 4/4 | Avg. wt. per turkey, 4/4 | Rank |
|---|---|---|---|---|---|---|---|
| 1C | 31 | L(A) | 30 | 161.50 | 5.38 | 1.56 | 4 |
| 2C | 30 | 0 | 30 | 161.50 | 5.38 | 1.80 | 2 |
| 3C | 32 | 0 | 32 | 142.50 | 4.45 | 1.84 | 1 |
| 4C | 33 | 0 | 33 | 164.75 | 4.99 | 1.69 | 3 |
|  | 126 |  | 125 |  |  |  |  |

A = accidental death.

*Table IIIC*

4/4–5/16—(6–12 WEEK PERIOD) PERIOD AFTER INOCULATION TO TERMINATION

| Group | No. of turkeys, 4/4 | Died, 4/4–5/16 | No. rem. | Feed cons., 4/4–5/16 | Avg. feed con. per poult, 4/4–5/16 | Avg. wt. per poult | Rank, 5/16 | Total feed con.,[1] 2/23 to 5/16 |
|---|---|---|---|---|---|---|---|---|
| 1C | 30 | 18 | 12 | 238.50 | 19.87 | 5.65 | 3 | 440 |
| 2C | 30 | 5 | 25 | 441.00 | 17.64 | 6.81 | 1 | 602 |
| 3C | 32 | 2 | 30 | 462.00 | 15.40 | 6.61 | 2 | 604.5 |
| 4C | 33 | 3 | 30 | 477.00 | 15.90 | 5.57 | 4 | 642.0 |
|  | 125 | 28 | 97 |  |  |  |  |  |

[1] Total feed consumption of no significance due to morbidity and mortality.

*Table IVC*

MORTALITY REVIEW ENTIRE EXPERIMENT

| Group | No. st., 2/23 | No. rem., 3/21 | Rem., 4/4 | Rem., 5/16 | Percent mort. all causes | Rank | Percent from blackhead | Rank |
|---|---|---|---|---|---|---|---|---|
| 1C | 32 | 31 | 30 | 12 | 62.5 | 3 | 40 | 4 |
| 2C | 32 | 30 | 30 | 25 | 21.8 | 3 | 16 | 3 |
| 3C | 33 | 33 | 32 | 32 | 9 | 1 | 9 | 1 |
| 4C | 33 | 33 | 33 | 30 | 9 | 1 | 9 | 2 |
|  | 130 | 126 | 125 | 97 |  |  |  |  |

*Table VC*

FEED CONSUMPTION REVIEW AV. PER POULT (LBS.) (T.M.=25%)

| Group | 4/21, 4 weeks | 4/4, 6 weeks | 5/16, 12 weeks |
|---|---|---|---|
| 1C | 2.03 | 5.38 | [1] 36.66 |
| 2C | 2.13 | 5.38 | [1] 24.03 |
| 3C | 1.75 | 4.45 | [1] 20.15 |
| 4C | 2.13 | 4.99 | [1] 21.40 |

[1] No significance due to morbidity and mortality.

AVERAGE WEIGHTS (IN POUNDS—14 DAY INTERVALS)

| Date | Group 1C | Group 2C | Group 3C | Group 4C |
|---|---|---|---|---|
| 2/23/56 | .11 | .11 | .11 | .11 |
| 3/7/56 | .29 | .33 | .34 | .29 |
| 3/21/56 | .76 | .87 | .92 | .79 |
| 4/4/56 | 1.57 | 1.80 | 1.84 | 1.70 |
| 4/18/56 | 2.45 | 3.36 | 3.01 | 2.65 |
| 5/2/56 | 3.90 | 4.76 | 4.80 | 4.07 |
| 5/16/56 | 5.65 | 6.81 | 6.61 | 5.57 |

FEED CONSUMPTION (IN POUNDS—14 DAY INTERVALS)

| Date | Group 1C | Group 2C | Group 3C | Group 4C |
|---|---|---|---|---|
| 2/23—3/7 | 14.75 | 17.75 | 17.50 | 16.00 |
| 3/7–3/21 | 48.25 | 46.25 | 38.50 | 54.50 |
| 3/21–4/4 | 98.50 | 97.50 | 86.50 | 94.25 |
| 4/4–4/18 | 93.00 | 103.00 | 100.75 | 113.75 |
| 4/18–5/2 | 6.100 | 155.50 | 160.25 | 176.25 |
| 5/2–5/16 | 84.50 | 182.00 | 201.00 | 187.25 |

OBSERVATIONS AND REMARKS

The control Group 1C consumed before and during the period of inoculation (1st 6 weeks) as much feed as the other pens with the exception of Group 3C (.05% p-ureido benzene arsonic acid). See Tables IC and IIC. Nevertheless, they showed the poorest weight gain, ranked 4th. No reason can be advanced for this lower weight unless it might be due to irregularity of sex distribution.

Group 2C (.4375% p-ureido benzene arsonic acid) showed about the same average feed consumption as Groups 1C and 3C (for the first 6 weeks and ranked second in weight; Tables IC and IIC. At the termination of the experiment Group 2C had the highest average weight per poult; Table IIIC. Group 2C (.0375% p-ureido benzene arsonic acid) showed a total mortality of 21%, which was the highest of the medicated groups, but only 16% was from blackhead after inoculation; Table IVC.

Group 3C (.05% p-ureido benzene arsonic acid) consumed less feed for the first six weeks than the other lots but had the best average weight per poult; Tables IC and IIC. Group 3C was tied with Group 4C in mortality for the entire experiment, the mortality being 9%; Table IV; but it should be noted here that Group 3C lost one bird before inoculation so it showed only a 6% loss due to blackhead which gives it the highest protective rating. Group 4C showed a 9% mortality for the entire experiment all due to blackhead after inoculation so it ranks second as far as blackhead protection is concerned to that of Group 3C.

The feed consumption of Group 4C was high the first six weeks but weight gains not as good as lots receiving p-ureido benzene arsonic acid but better than the control. Whether sex distribution could have influenced this unconformity is a probability.

This series of tests show that p-ureido benzene arsonic acid is efficacious as a blackhead preventive. It appears that effective dosage may be provided between .0375% and .05% concentration in the feed ration.

Analyses for arsenic in muscle tissue showed a range of .05 to .11 p.p.m. of arsenic (as $As_2O_3$) before withdrawal of the medicated rations in Groups 2C and 3C. After two further weeks on unmedicated feed, the muscle tissue showed levels of .03 p.p.m. or less of arsenic (as $As_2O_3$). There was no gross differences noted between muscle tissue from hens or toms or between the two Groups 2C and 3C.

Liver tissue showed a range of .67 p.p.m. $As_2O_3$ to .33 p.p.m. before withdrawal of the medicated rations. After two further weeks on unmedicated rations these values ranged from .03 p.p.m. to .22 p.p.m. There were no gross differences between liver tissue from hens or toms.

EXAMPLE D

A test was conducted to determine the palatability and efficacy against blackhead of the sodium salt of p-ureido benzene arsonic acid in the drinking water.

Day-old turkey poults were received for use in this test. They were grown in batteries and were not exposed to other turkeys at any time.

At 26 days, thirty normal turkey poults were divided at random into three groups of ten each. Groups 2D and 3D received medicated drinking water continuously for two weeks while Group 1D received plain water. All three groups were given unmedicated feed.

On the 28th, 29th, and 30th days, all poults were inoculated orally with 300 embryonated cecal worm eggs. Water consumption, weights, and feed consumption were recorded. The results and data are set forth in Table ID.

Table ID
MEDICATED DRINKING WATER

| Group | P-ureido benzene arsonic acid [1] |
|---|---|
| 1D | None (control). |
| 2D | 0.02%. |
| 3D | 0.04%. |

[1] Supplied as a concentrated solution termed "W-O Soluble" which contained 5.1% p-ureido benzene arsonic acid as the sodium salt.

AVERAGE WEIGHT (IN POUNDS)

| Group | 26 days | 33 days | 40 days | 47 days |
|---|---|---|---|---|
| 1D | .98 | 1.27 | 1.17 | 1.44 |
| 2D | .88 | 1.13 | 1.28 | 1.86 |
| 3D | 1.04 | 1.32 | 1.70 | 2.19 |

FEED CONSUMPTION (IN POUNDS)

| Group | 26–33 days | 33–40 days | 40–47 days |
|---|---|---|---|
| 1D | 8.75 | 4.05 | 2.68 |
| 2D | 9.15 | 9.53 | 3.83 |
| 3D | 10.00 | 11.20 | 8.63 |

WATER CONSUMPTION (FLUID OZS.)

| Group: | 26 to 40 days |
|---|---|
| 1D | 1,172 |
| 2D | 2,810 |
| 3D | 2,860 |

PERCENT MORTALITY DUE TO BLACKHEAD

| Group: | Percent |
|---|---|
| 1D | 75 |
| 2D | 0 |
| 3D | 0 |

BLACKHEAD LESIONS

| Group | Cecal lesions | | | | Liver lesions | | | |
|---|---|---|---|---|---|---|---|---|
| | None | Slight | Medium | Severe | None | Slight | Medium | Severe |
| 1D | | | | 10 | | | | 10 |
| 2D | 5 | 4 | 1 | | 9 | 1 | | |
| 3D | 4 | 6 | | | 10 | | | |

These tests show that the use of p-ureido benzene arsonic acid in the drinking water as the sodium salt prevented mortality due to blackhead disease. The drug was palatable in the drinking water. No ill effects were noted.

EXAMPLE E

A test was carried out to show the effect of varying levels of p-ureido benzene arsonic acid in feed mash, fed ad libitum to chickens. A flock of leghorn cockerel chicks were divided into groups of 10 each. Group 1E (control group) was fed mash, containing no medication. Group 2E was fed the same mash but containing .025% of p-ureido benzene arsonic acid; Group 3E the same mash containing the same drug at 0.05% concentration and Group 4E the same mash containing the same drug at 0.1% concentration. All groups were fed ad libitum for three weeks during the test which was begun at six weeks of age. All birds were vaccinated for fowl pox and were fed 300 embryonated cecal worms each day for three days beginning on the first day of the test.

During the course of this test there was a mortality from blackhead of 50% in the control group 1E. None of the birds in medicated groups (Groups 2E, 3E, 4E) died. The average rating of blackhead lesions on post mortem examination on an arbitrary scale 0 for no lesions to 3 for very severe lesions was: Group 4E—rating .025; Group 3E—rating .2; Group 2E—rating .175 and Group 1E (control—no medication)—2.275. That is, the birds which received the medication showed substantially fewer lesions and all survived, whereas the control group receiving no medication, but the same amount of induced infection of blackhead showed a mortality of 50% during the three weeks test period and also very severe liver and cecal lesions due to blackhead.

In addition to the laboratory tests described above, the compositions provided by the invention have also been used successfully as a preventive against blackhead in large commercial flocks of turkeys and chickens. In some of these, the flocks were severely exposed to blackhead, but no outbreaks occurred in any of the test birds. The medicated feed was readily consumed and the birds grew well to a good finish.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A chemotherapeutic composition for use as a preventive for controlling blackhead in poultry which comprises a poultry feed ration and a compound selected from the group consisting of p-ureido benzene arsonic acid and salts thereof in the approximate concentration of 0.01% to 1.0%.

2. A veterinary chemotherapeutic composition for use as a preventive for controlling blackhead in poultry which comprises a combined mixture of poultry feed mash and p-ureido benzene arsonic acid in a concentration of .05% to 0.1%.

3. A veterinary chemotherapeutic composition for use as a preventive for controlling blackhead in poultry which comprises a mixture of an aqueous drinking liquid and p-ureido benzene arsonic acid in the form of a salt in a concentration of .005% to .05%.

4. A veterinary chemotherapeutic composition for preventing blackhead in turkeys which comprises a nontoxic combination of turkey feed mash and p-ureido benzene arsonic acid in a concentration of .02% to .05%.

5. A veterinary chemotherapeutic feed ration which may be fed ad libitum to a flock of turkeys for preventing blackhead in the turkeys which comprises a turkey feed mash in which is intimately intermixed approximately .0375% of p-ureido benzene arsonic acid.

6. A veterinary chemotherapeutic composition for ad libitum feeding to a flock of poultry as a preventive for controlling blackhead in the poultry which comprises a poultry ration and a compound incorporated therein selected from the group consisting of p-ureido benzene arsonic acid and salts thereof in a concentration of from 0.01% to 1.0%, said compound being present in amount sufficient to provide effective dosage without intolerable toxic effect upon the poultry when administered by feeding the composition ad libitum to the poultry.

7. A process for combatting blackhead disease in a flock of poultry which comprises introducing into the intestinal tracts of the birds, infected with the protozoan parasite *Histomonas meleagridis* which causes the disease, a poultry feed ration containing intermixed therewith from 0.01% to 1.0% of a compound selected from the group consisting of p-ureido benzene arsonic acid and salts thereof.

8. A method of preventing blackhead disease in a flock of turkeys which comprises introducing into the intestinal tracts of the birds infected with the causitive agent, namely, the protozoan parasite *Histomonas meleagridis*, by feeding ad libitum to the turkeys a turkey feed mash containing intermixed therewith not less than .02% and not more than .05%, of p-ureido benzene arsonic acid.

9. A method of preventing blackhead disease in a flock of turkeys which comprises introducing into the intestinal tracts of the birds infected with the causitive agent, namely, the protozoan parasite *Histomonas meleagridis*, by feeding ad libitum to the turkeys a turkey feed mash containing intermixed therewith about .0375% of p-ureido benzene arsonic acid.

10. A method of preventing blackhead disease in a flock of turkeys which comprises introducing into the intestinal tracts of the birds infected with the causitive agent, namely, the protozoan parasite *Histomonas meleagridis* by feeding ad libitum to the turkeys a comestible liquid ration containing intermixed therewith p-ureido benzene arsonic acid in a concentration of from .005% to .05%.

References Cited in the file of this patent

Hutyra: Pathology and Therapeutics of the Diseases of Domestic Animals, vol. II, 1938, Alexander Eger, Chicago, Illinois, pp. 359–361.

U.S. Dispensatory, 25th Ed., 1955, pp. 246–247.

Wantland: J. Parasitology, vol. 40, pages 479 and 480, August 1954.

Milks: Veterinary Pharmacology, Materia Medica and Therapeutics, Sixth Edition, 1949, Alex Eger, Chicago, Ill., p. 500.